US010308169B1

(12) United States Patent
Weedon et al.

(10) Patent No.: US 10,308,169 B1
(45) Date of Patent: Jun. 4, 2019

(54) AUXILIARY VEHICLE DIRECTION LIGHTS

(71) Applicants: Bryon Weedon, Punta Gorda, FL (US); Gail Weedon, Punta Gorda, FL (US)

(72) Inventors: Bryon Weedon, Punta Gorda, FL (US); Gail Weedon, Punta Gorda, FL (US)

( * ) Notice: Subject to any disclaimer, the term of this patent is extended or adjusted under 35 U.S.C. 154(b) by 0 days.

(21) Appl. No.: 15/906,029

(22) Filed: Feb. 27, 2018

(51) Int. Cl.
*B60Q 1/38* (2006.01)
(52) U.S. Cl.
CPC .................................. *B60Q 1/38* (2013.01)
(58) Field of Classification Search
CPC ..... H04W 4/02; H04W 64/00; H04W 88/005; H04W 4/027; H04W 64/006; H04W 4/025; H04W 4/90; H04W 76/50; H04W 88/06; H04W 24/00; H04W 24/10; H04W 4/023; H04W 76/34; H04W 88/16; H04W 8/183; H04W 28/04; H04W 4/021; G08B 21/0269; G08B 21/0272; G08B 13/14; G08B 21/0263; G08B 21/0275; G08B 21/028; G08B 21/0283; G08B 21/0453; G08B 25/016; G08B 25/08; G08B 25/10; G01S 5/0294; G01S 19/48; G01S 5/0009; G01S 3/14; G01S 5/0252; G01S 5/0257; G01S 5/0278; G01S 5/0018; G01S 5/0263; G01S 13/878; G01S 2013/466; G01S 2013/468; G01S 5/0268; G01S 5/0289; G01S 5/04; G01S 1/026; G01S 1/028; G01S 1/045; G01S 2205/006; G01S 2205/008; G01S 5/0054; G01S 5/02; G01S 5/0205; G01S 5/021; G01S 5/06; B60R 2325/105; B60R 2325/205; B60R 25/102; B60R 25/33; G06Q 30/0283; G06Q 10/08; G06Q 20/3224; G06Q 1/20; G06Q 1/096811; G06Q 1/04; G06Q 1/085; G06Q 1/1423; G06Q 2300/054; G06Q 2300/112; G06Q 2300/116; G06Q 2300/122; G06Q 2300/134; G06Q 2300/142; G06Q 2300/21; G06Q 2300/23; G06Q 2300/312; G06Q 2300/314; G06Q 2300/322; G06Q 2300/41; G06Q 2300/42; F21K 9/23; F21K 9/232; F21S 41/143; F21S 41/147; F21S 41/65; (Continued)

(56) References Cited

U.S. PATENT DOCUMENTS 1,674,022 A 6/1928 Schairer
D91,190 S 12/1933 George
(Continued)

FOREIGN PATENT DOCUMENTS

WO 2005009785 A 5/2006

*Primary Examiner* — Daniel Previl (57) ABSTRACT

The auxiliary vehicle direction light is an optical signaling system. The auxiliary vehicle direction light is adapted for use with an emergency vehicle. The auxiliary vehicle direction light is a visual display that indicates the intended direction of the emergency vehicle when the emergency vehicle is in route to its dispatched destination. The auxiliary vehicle direction light comprises one or more displays, a logical device, and a plurality of inputs. The emergency device provides the plurality of inputs to the logical device. The logical device converts the plurality of inputs into a plurality of control signals that are used to control the plurality of display. Each of the plurality of control signals instructs a display selected from the one or more displays to illuminate a directional signal selected from a plurality of directional signals.

12 Claims, 5 Drawing Sheets

(58) Field of Classification Search
CPC .. F21S 4/28; F21V 19/02; F21V 21/02; F21V 21/30; F21V 23/0464; F21V 23/0471; F21V 23/0478; F21V 29/74; F21W 2102/00; F21W 2111/023; F21W 2111/027; F21W 2111/08; F21W 2131/103; F21W 2131/40; F21Y 2113/00; F21Y 2115/10; H04L 67/18; H05B 33/0812; H05B 33/0857; H05B 33/0863; H05B 37/02; H05B 37/0218; H05B 37/0227; H05B 3/008; Y02B 20/343; Y02B 20/383; Y02B 20/46; H02J 2007/0059; H02J 2007/0096; H02J 50/12; H02J 50/80; H02J 5/005; H02J 7/0029; Y02D 70/10; G01C 21/206
USPC .......... 340/472, 815.45, 471, 907, 908, 469, 340/321, 489, 463, 468, 480, 483, 340/464–465, 473–479
See application file for complete search history.

(56) References Cited

U.S. PATENT DOCUMENTS

| | | | |
|---|---|---|---|
| D97,887 S | 12/1935 | Andrews | |
| 2,252,339 A | 8/1941 | Baker | |
| 3,518,624 A | 6/1970 | Smith, Jr. | |
| 6,788,217 B2* | 9/2004 | Pederson | B60Q 1/2611 340/471 |
| 6,952,162 B2* | 10/2005 | Monck | B60Q 1/34 340/464 |
| 7,806,070 B2 | 10/2010 | Williams | |
| 9,126,532 B2* | 9/2015 | Ichino | B60Q 1/50 |
| 9,830,841 B2* | 11/2017 | Shipman | G09F 13/20 |
| 2002/0012251 A1* | 1/2002 | Lee | B60Q 1/26 362/540 |
| 2012/0173900 A1* | 7/2012 | Diab | H04L 12/10 713/310 |
| 2014/0266665 A1 | 9/2014 | Haushalter | |
| 2017/0126021 A1* | 5/2017 | Desrosiers | H02J 5/005 |

* cited by examiner

AUXILIARY VEHICLE DIRECTION LIGHTS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation including vehicles and vehicle fittings, more specifically, an optical signaling device configured for use with emergency vehicles.

Emergency vehicles are involved in a disproportionate number of accidents that occur at intersections. Because the driver of a vehicle does not know the direction that the emergency vehicle will take, drivers will inadvertently turn into the path of the emergency vehicle thereby causing an accident.

Clearly, a method to more clearly notify vehicle drivers of the intention of the driver of an emergency vehicle at an intersection would be of benefit.

SUMMARY OF INVENTION

The auxiliary vehicle direction light is an optical signaling system. The auxiliary vehicle direction light is adapted for use with an emergency vehicle. The auxiliary vehicle direction light is a visual display that indicates the intended direction of the emergency vehicle when the emergency vehicle is in route to its dispatched destination. The auxiliary vehicle direction light comprises one or more displays, a logical device, and a plurality of inputs. The emergency device provides the plurality of inputs to the logical device. The logical device converts the plurality of inputs into a plurality of control signals that are used to control the plurality of display. Each of the plurality of control signals instructs a display selected from the one or more displays to illuminate a directional signal selected from a plurality of directional signals.

These together with additional objects, features and advantages of the auxiliary vehicle direction light will be readily apparent to those of ordinary skill in the art upon reading the following detailed description of the presently preferred, but nonetheless illustrative, embodiments when taken in conjunction with the accompanying drawings.

In this respect, before explaining the current embodiments of the auxiliary vehicle direction light in detail, it is to be understood that the auxiliary vehicle direction light is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the auxiliary vehicle direction light.

It is therefore important that the claims be regarded as including such equivalent construction insofar as they do not depart from the spirit and scope of the auxiliary vehicle direction light. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
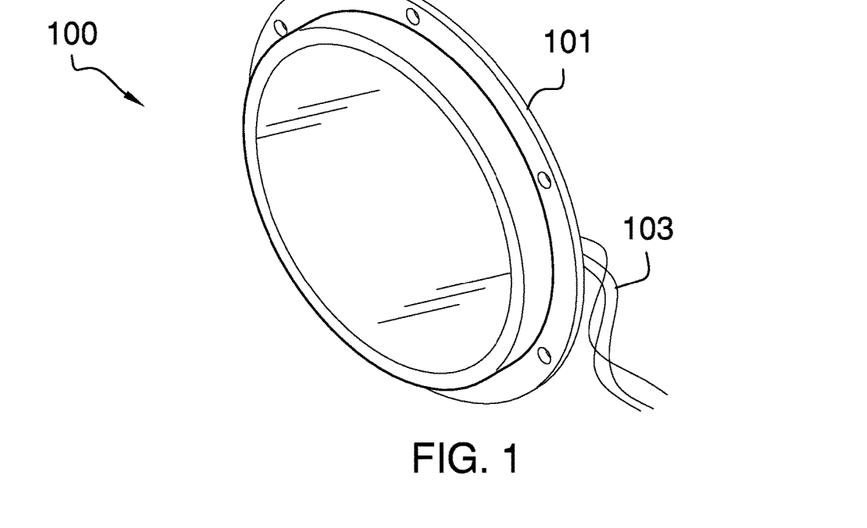
FIG. 1 is a perspective view of an embodiment of the disclosure.
Figure 2:
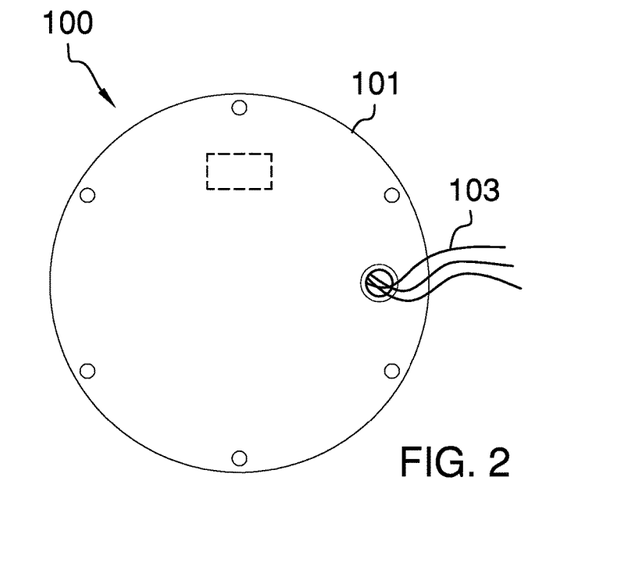
FIG. 2 is a rear view of an embodiment of the disclosure.
Figure 3:
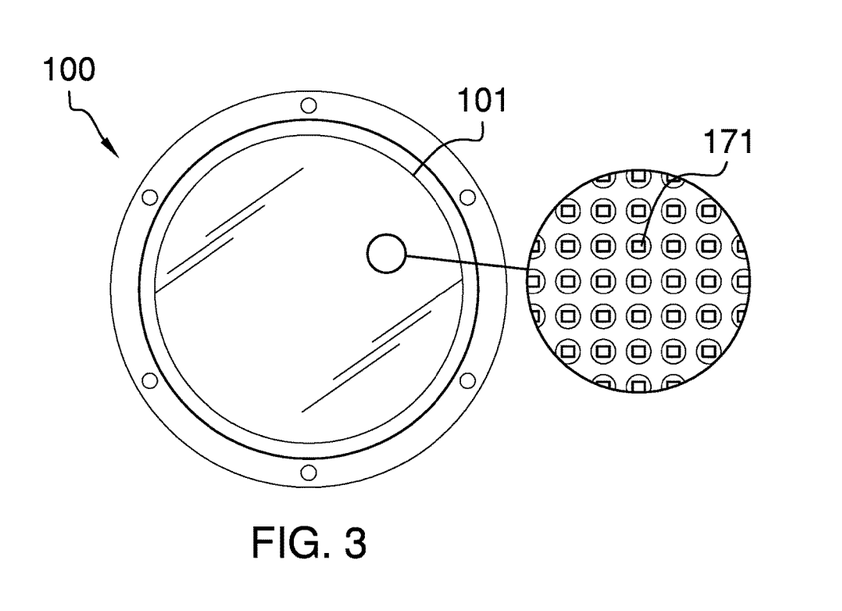
FIG. 3 is a front view of an embodiment of the disclosure.
Figure 4:
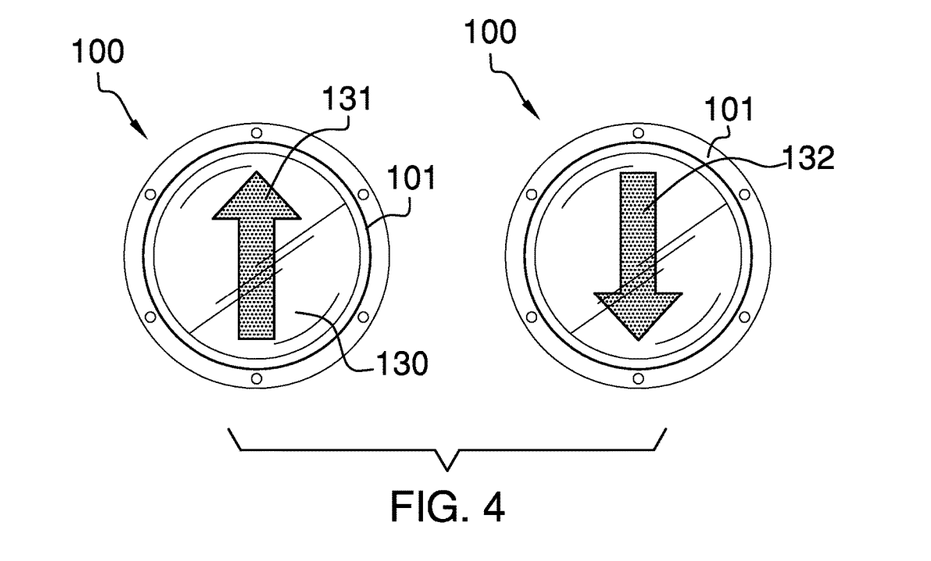
FIG. 4 is a detail view of an embodiment of the disclosure.
Figure 5:
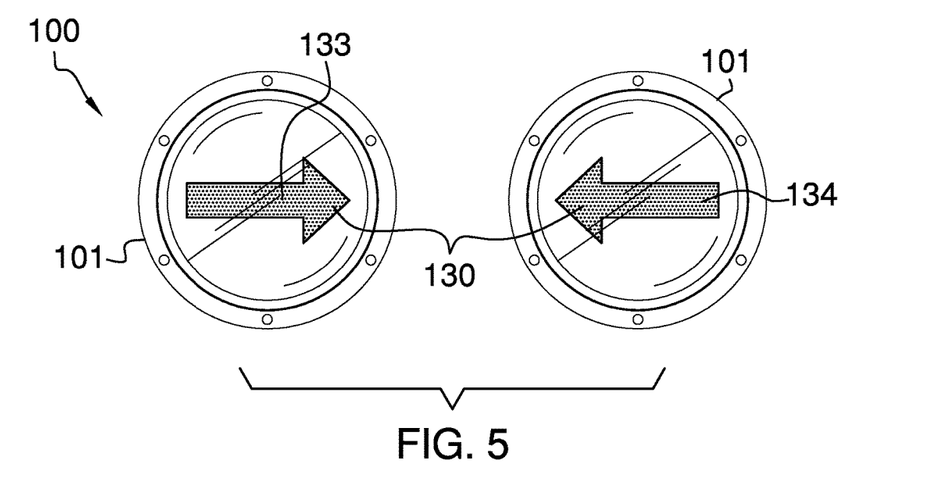
FIG. 5 is a detail view of an embodiment of the disclosure.
Figure 6:
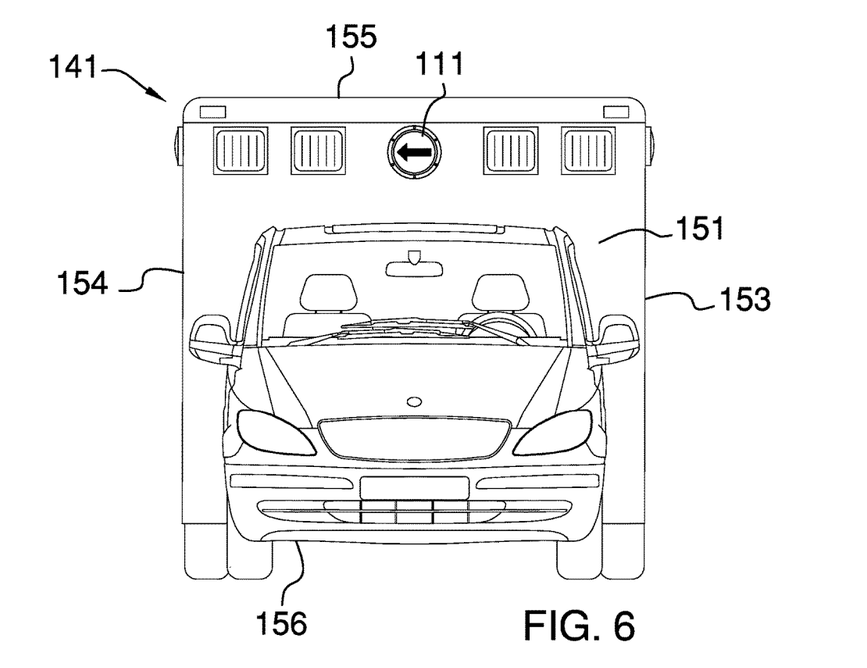
FIG. 6 is an in-use view of an embodiment of the disclosure.
Figure 7:
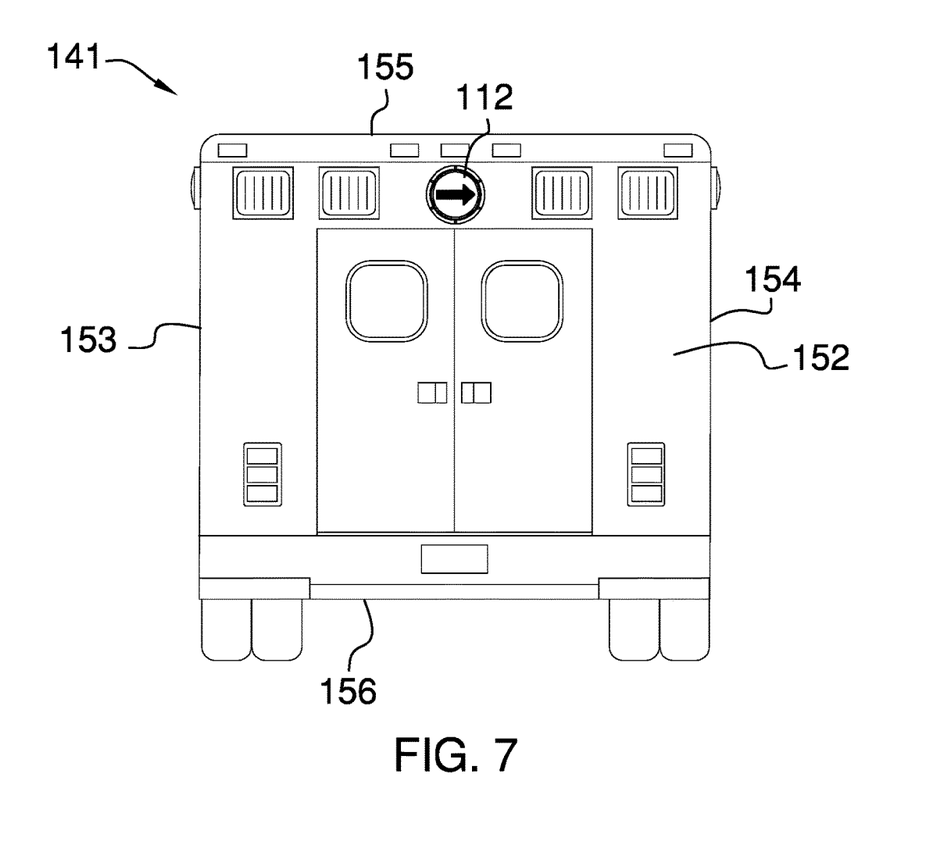
FIG. 7 is an in-use view of an embodiment of the disclosure.
Figure 8:
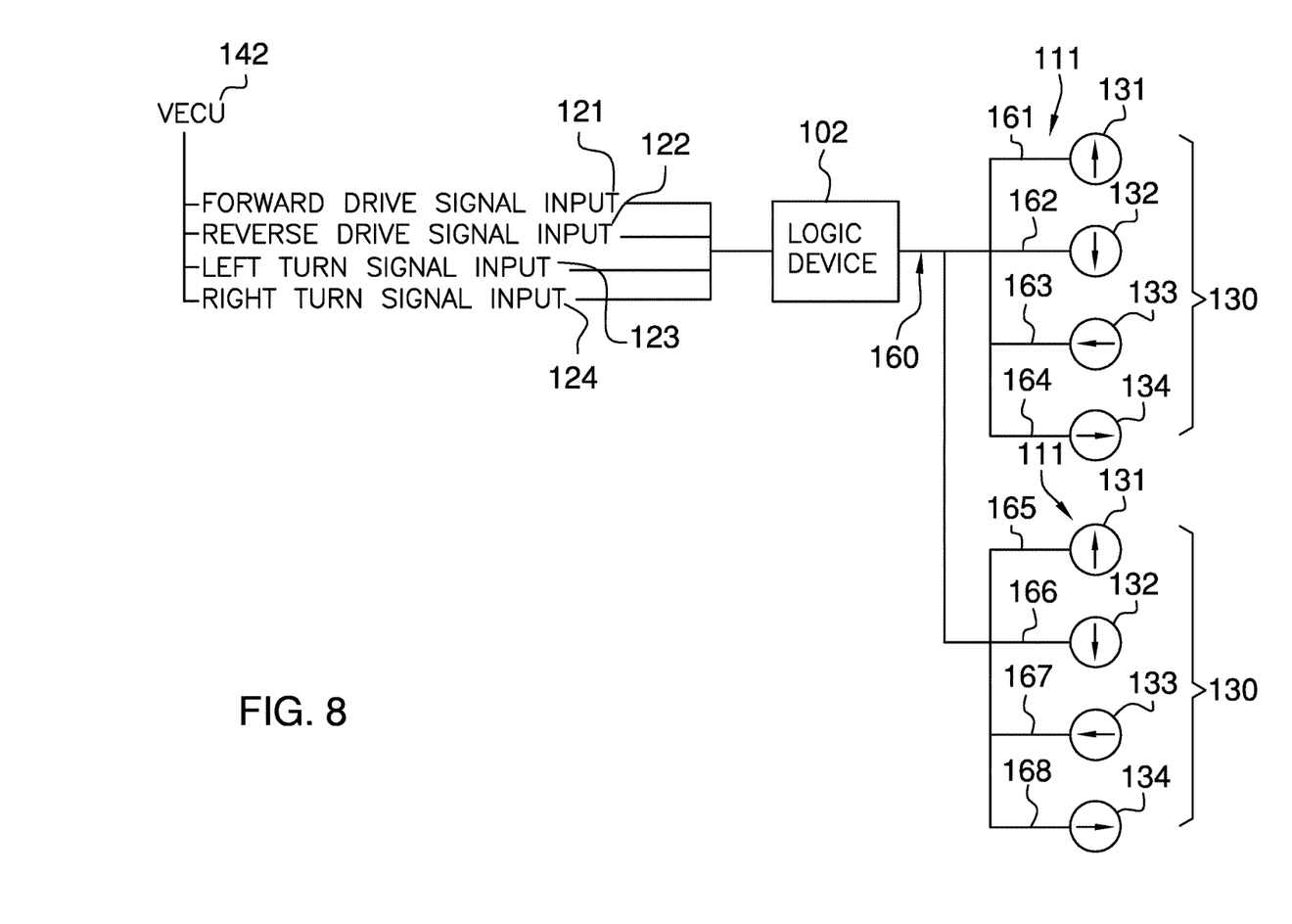
FIG. 8 is a block diagram of an embodiment of the disclosure.

Detailed reference will now be made to one or more potential embodiments of the disclosure, which are illustrated in FIGS. 1 through 8.

The auxiliary vehicle direction light 100 (hereinafter invention) is an optical signaling system. The invention 100 is adapted for use with an emergency vehicle 141. The invention 100 is a visual display that indicates the intended direction of the emergency vehicle 141 when the emergency vehicle 141 is in route to its dispatched destination. The invention 100 comprises one or more displays 101, a logical device 102, and a plurality of inputs 103. The emergency device provides the plurality of inputs 103 to the logical device 102. The logical device 102 converts the plurality of inputs 103 into a plurality of control signals 160 that are used to control the one or more displays 101. Each of the plurality of control signals 160 instructs a display selected from the one or more displays 101 to illuminate a direction signal selected from a plurality of direction signals 130.

The emergency vehicle 141 is a vehicle used for emergency purposes. Examples of emergency vehicles 141 include, but are not limited to, law enforcement vehicles, emergency medical response vehicles, and fire response vehicles. The emergency vehicle 141 further comprises a vehicle engine control unit 142. The vehicle engine control unit 142 an electrical device that controls all the electrical functions of the emergency vehicle 141. The vehicle engine control unit 142 provides the control signals used to instruct the operation of the invention 100. The vehicle engine control unit 142 provides the electrical energy required to operate the invention 100. The emergency vehicle 141 is further defined with a front side 151, a rear side 152, a left side 153, a right side 154, a top side 155, and a bottom side 156.

The front side 151 is the side of the emergency vehicle 141 that leads the emergency vehicle 141 when the emergency vehicle 141 is moving towards the primary sense of direction of the emergency vehicle 141. The rear side 152 is the side of the emergency vehicle 141 that is distal from the front side 151. The left side 153 is the side of the vehicle that is to the left of a viewer when the viewer directly faces the rear side 152 of the emergency vehicle 141. The right side 154 is the side of the vehicle that is to the right of a viewer when the viewer directly faces the rear side 152 of the emergency vehicle 141. The top side 155 is the side of the vehicle that is distal from the bottom side 156. The bottom side 156 is the side of the vehicle that is proximal to the road.

The plurality of inputs 103 are electrical signals generated by the vehicle engine control unit 142. Each of the plurality of inputs 103 provides an indication to the logical device 102 regarding the intended direction of the emergency vehicle 141.

The plurality of inputs 103 comprises a forward drive signal input 121, a rear drive signal input 122, a left turn signal input 123, and a right turn signal input 124. The forward drive signal input 121, the rear drive signal input 122, the left turn signal input 123, and the right turn signal input 124 are generated by the vehicle engine control unit 142.

The forward drive signal input 121 is an electrical signal generated by the vehicle engine control unit 142. The forward drive signal input 121 indicates that the transmission of the emergency vehicle 141 is in the drive position. The rear drive signal input 122 is an electrical signal generated by the vehicle engine control unit 142. The rear drive signal input 122 indicates that the transmission of the emergency vehicle 141 is in the reverse position. The left turn signal input 123 is an electrical signal generated by the vehicle engine control unit 142. The left turn signal input 123 indicates that the left turn signal of the emergency vehicle 141 is engaged. The right turn signal input 124 is an electrical signal generated by the vehicle engine control unit 142. The right turn signal input 124 indicates that the right turn signal of the emergency vehicle 141 is engaged.

The one or more displays 101 are electrically illuminated display devices. The one or more displays 101 are powered by the vehicle engine control unit 142. Each of the one or more displays 101 are prominently and visibly mounted on the emergency vehicle 141 at a position proximal to the top side 155 of the emergency vehicle 141. Each of the one or more displays 101 is controlled by the logical device 102. The one or more displays 101 are used to display the plurality of direction signals 130 while the emergency vehicle 141 is in operation.

Each of the one or more displays 101 displays a plurality of direction signals 130. The plurality of direction signals 130 are identical for each of the one or more displays 101. The plurality of direction signals 130 comprises a forward indication arrow 131, a reverse indication arrow 132, a left indication arrow 133 and a right indication arrow 134.

The one or more displays 101 comprises a front side 151 display 111 and a rear side 152 display 112. The front side 151 display 111 is a display selected from the one or more displays 101. The front side 151 display 111 mounts visibly on the front side 151 of the emergency vehicle 141 proximal to the top side 155 of the emergency vehicle 141. The rear side 152 display 112 is a display selected from the one or more displays 101. The rear side 152 display 112 mounts visibly on the rear side 152 of the emergency vehicle 141 proximal to the top side 155 of the emergency vehicle 141.

Each of the plurality of direction signals 130 forms an indication arrow that is visibly displayed by each of the one or more displays 101. The forward indication arrow 131 is an indication arrow that points towards the top side 155 of the emergency vehicle 141. The reverse indication arrow 132 is an indication arrow that points towards the bottom side 156 of the emergency vehicle 141. The left indication arrow 133 is an indication arrow that points towards the left side 153 of the emergency vehicle 141. The right indication arrow 134 is an indication arrow that points towards the right side 154 of the emergency vehicle 141.

The forward indication arrow 131 forms the image of an indication arrow that points to the top side 155 of the emergency vehicle 141. The reverse indication arrow 132 forms the image of an indication arrow that points to the bottom side 156 of the emergency vehicle 141. The left indication arrow 133 forms the image of an indication arrow that points to the left side 153 of the emergency vehicle 141. The right indication arrow 134 forms the image of an indication arrow that points to the right side 154 of the emergency vehicle 141.

To maintain the proper orientation of the displayed direction signal, the left indication arrow 133 of the front side 151 display 111 points to the right when the front side 151 display 111 is viewed directly and the left indication arrow 133 of the rear side 152 display 112 points to the left when the rear side 152 display 112 is viewed directly.

To maintain the proper orientation of the displayed direction signal, the right indication arrow 134 of the front side 151 display 111 points to the left when the front side 151 display 111 is viewed directly and the right indication arrow 134 of the rear side 152 display 112 points to the right when the rear side 152 display 112 is viewed directly.

The logical device 102 is an electrical circuit. The logical device 102 forms a logic circuit that: 1) receives the plurality of inputs 103 from the vehicle engine control unit 142; and, 2) based on the received inputs generates one or more control signals selected from the plurality of control signals 160. The logical device 102 is selected from the group consisting of a programmable electrical circuit and a non-programmable electrical circuit. The logical device 102 is electrically connected to, and draws power from, the vehicle engine control unit 142 of the emergency vehicle 141. Methods to design and fabricate the logical device 102 are well-known and documented in the electrical arts.

The logical device 102 comprises a plurality of control signals 160. Each of the one or more displays 101 receives a control signal selected from a plurality of control signals 160 generated by the logical device 102. The one or more displays 101 selects the direction signal to be displayed from the plurality of direction signals 130 based on the control signal selected from the plurality of control signals 160 provided to the logical device 102 by the vehicle engine control unit 142.

The plurality of control signals 160 comprises a collection of electrical signals that are used to operate the front side 151 display 111 and the rear side 152 display 112. The plurality of control signals 160 comprises a front side 151 forward control signal 161, a front side 151 reverse control signal 162, a front side 151 left control signal 163, a front side 151 right control signal 164, a rear side 152 forward control signal 165, a rear side 152 reverse control signal 166, a rear side 152 left control signal 167, and a rear side 152 right control signal 168.

The front side 151 forward control signal 161 is an electrical signal generated by the logical device 102 that is transmitted to the front side 151 display 111. The front side 151 forward control signal 161 electrically triggers the front side 151 display 111 to display the forward indication arrow 131.

The front side 151 reverse control signal 162 is an electrical signal generated by the logical device 102 that is transmitted to the front side 151 display 111. The front side 151 reverse control signal 162 electrically triggers the front side 151 display 111 to display the reverse indication arrow 132.

The front side 151 left control signal 163 is an electrical signal generated by the logical device 102 that is transmitted to the front side 151 display 111. The front side 151 left control signal 163 electrically triggers the front side 151 display 111 to display the left indication arrow 133.

The front side 151 right control signal 164 is an electrical signal generated by the logical device 102 that is transmitted to the front side 151 display 111. The front side 151 right control signal 164 electrically triggers the front side 151 display 111 to display the right indication arrow 134.

The rear side 152 forward control signal 165 is an electrical signal generated by the logical device 102 that is transmitted to the rear side 152 display 112. The rear side 152 forward control signal 165 electrically triggers the rear side 152 display 112 to display the forward indication arrow 131.

The rear side 152 reverse control signal 166 is an electrical signal generated by the logical device 102 that is transmitted to the rear side 152 display 112. The rear side 152 reverse control signal 166 electrically triggers the rear side 152 display 112 to display the reverse indication arrow 132.

The rear side 152 left control signal 167 is an electrical signal generated by the logical device 102 that is transmitted to the rear side 152 display 112. The rear side 152 left control signal 167 electrically triggers the rear side 152 display 112 to display the left indication arrow 133.

The rear side 152 right control signal 168 is an electrical signal generated by the logical device 102 that is transmitted to the rear side 152 display 112. The rear side 152 right control signal 168 electrically triggers the rear side 152 display 112 to display the right indication arrow 134.

In the first potential embodiment of the disclosure, the logical device 102 comprises a circuit network that illuminates a plurality of LEDs 171 into the signal selected from the plurality of direction signals 130 as selected by the logical device 102 based on the plurality of inputs 103. The plurality of LEDs 171 comprise a collection of LEDs that are used to illuminate the plurality of direction signals 130. Methods to form directional displays using LEDs are well known and documented in the electrical arts.

The following definitions were used in this disclosure:

Display: As used in this disclosure, a display is a surface upon which is presented an image, potentially including, but not limited to, graphic images and text, that is interpretable by an individual viewing the projected image in a meaningful manner.

LCD: As used in this disclosure, LCD is an acronym for Liquid Crystal Display. A liquid crystal display comprises a liquid crystal film placed between two sheets of transparent material. The visual characteristics of the LCD can be varied through the application of a voltage.

LED: As used in this disclosure, an LED is an acronym for a light emitting diode. A light emitting diode is a diode that is also a light source.

Logical Device: As used in this disclosure, a logical device is an electrical device that processes externally provided inputs to generate outputs that are determined from a previously determined logical functions. A logical device may or may not be programmable.

Primary Sense of Direction: As used in this disclosure, the primary sense of direction of an object refers to a vector that: 1) passes through the center of the object; and, 2) is parallel to the direction of travel when the front surface(s) of the object are leading the object into the direction of travel. This definition intends to align with what people would normally call the forward direction of an object.

VECU: As used in this disclosure, the VECU is an acronym for the Vehicle Engine Control Unit of the vehicle. The VECU is an electronic device that controls the operation of all electrical subsystems within a vehicle.

Vehicle: As used in this disclosure, a vehicle is a motorized device used for transporting passengers, goods, or equipment. The term motorized vehicle refers to a vehicle can move under power provided by an electric motor or an internal combustion engine.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A signaling device comprising:
  one or more displays, a logical device, and a plurality of inputs;
  wherein the logical device forms an interface between the plurality of inputs and the one or more displays;
  wherein the one or more displays indicate the intended direction of the emergency vehicle;
  wherein the signaling device is an optical signaling system;
  wherein the signaling device is adapted for use with an emergency vehicle;
  wherein the emergency device provides the plurality of inputs to the logical device;
  wherein the signaling device is a visual display;

wherein the emergency vehicle further comprises a transmission and a vehicle engine control unit;

wherein the vehicle engine control unit instructs the operation of the signaling device;

wherein the vehicle engine control unit provides the electrical energy required to operate the signaling device;

wherein the emergency vehicle is further defined with a front side, a rear side, a left side, a right side, a top side, and a bottom side;

wherein the plurality of inputs are signals generated by the vehicle engine control unit;

wherein the logical device receives the plurality of inputs from the vehicle engine control unit;

wherein the one or more displays are electrically illuminated display devices;

wherein each of the one or more displays are prominently and visibly mounted on the emergency vehicle at a position proximal to the top side of the emergency vehicle;

wherein each of the one or more displays is controlled by the logical device;

wherein each of the one or more displays display a plurality of direction signals;

wherein the plurality of direction signals are identical for each of the one or more displays;

wherein the logical device is an electrical circuit;

wherein the logical device forms a logic circuit;

wherein the logical device is selected from the group consisting of a programmable electrical circuit and a non-programmable electrical circuit;

wherein the logical device is electrically connected to the vehicle engine control unit of the emergency vehicle;

wherein the logical device comprises a plurality of control signals;

wherein each of the plurality of inputs provides an indication to the logical device regarding the intended direction of the emergency vehicle;

wherein the logical device generates one or more control signals selected from the plurality of control signals based on the received inputs;

wherein each of the one or more displays receives a control signal selected from a plurality of control signals generated by the logical device;

wherein each of the one or more displays select the direction signal to be displayed from the plurality of direction signals based on the control signal selected from the plurality of control signals provided to the logical device by the vehicle engine control unit;

wherein the plurality of inputs comprises a forward drive signal input, a rear drive signal input, a left turn signal input, and a right turn signal input;

wherein the forward drive signal input is an electrical signal generated by the vehicle engine control unit;

wherein the rear drive signal input is an electrical signal generated by the vehicle engine control unit;

wherein the left turn signal input is an electrical signal generated by the vehicle engine control unit;

wherein the right turn signal input is an electrical signal generated by the vehicle engine control unit.

2. The signaling device according to claim 1 wherein the forward drive signal input indicates that the transmission of the emergency vehicle is in the drive position;

wherein the rear drive signal input indicates that the transmission of the emergency vehicle is in the reverse position;

wherein the left turn signal input indicates that a left turn signal of the emergency vehicle is engaged by the vehicle engine control unit;

wherein the right turn signal input indicates that a right turn signal of the emergency vehicle is engaged by the vehicle engine control unit.

3. The signaling device according to claim 2 wherein each of the plurality of direction signals forms an indication arrow that is visibly displayed by each of the one or more displays;

wherein the plurality of direction signals comprises a forward indication arrow, a reverse indication arrow, a left indication arrow and a right indication arrow;

wherein the forward indication arrow forms the image of an indication arrow that points to the top side of the emergency vehicle;

wherein the reverse indication arrow forms the image of an indication arrow that points to the bottom side of the emergency vehicle;

wherein the left indication arrow forms the image of an indication arrow that points to the left side of the emergency vehicle;

wherein the right indication arrow forms the image of an indication arrow that points to the right side of the emergency vehicle.

4. The signaling device according to claim 3 wherein the left indication arrow of the front side display points to the right when the front side display is viewed directly;

wherein the left indication arrow of the rear side display points to the left when the rear side display is viewed directly;

wherein the right indication arrow of the front side display points to the left when the front side display is viewed directly;

wherein the right indication arrow of the rear side display points to the right when the rear side display is viewed directly.

5. The signaling device according to claim 4 wherein the plurality of control signals comprises a front side forward control signal, a front side reverse control signal, a front side left control signal, a front side right control signal, a rear side forward control signal, a rear side reverse control signal, a rear side left control signal, and a rear side right control signal;

wherein the front side forward control signal is an electrical signal generated by the logical device;

wherein the front side reverse control signal is an electrical signal generated by the logical device;

wherein the front side left control signal is an electrical signal generated by the logical device;

wherein the front side right control signal is an electrical signal generated by the logical device;

wherein the rear side forward control signal is an electrical signal generated by the logical device;

wherein the rear side reverse control signal is an electrical signal generated by the logical device;

wherein the rear side left control signal is an electrical signal generated by the logical device;

wherein the rear side right control signal is an electrical signal electrical signal generated by the logical device.

6. The signaling device according to claim 5 wherein the one or more displays comprises a front side display;

wherein the front side display is a display selected from the one or more displays;

wherein the front side display mounts visibly on the front side of the emergency vehicle proximal to the top side of the emergency vehicle.

7. The signaling device according to claim 6
wherein the front side forward control signal is transmitted to the front side display;
wherein the front side reverse control signal is transmitted to the front side display;
wherein the front side left control signal is transmitted to the front side display;
wherein the front side right control signal is transmitted to the front side display.

8. The signaling device according to claim 7
wherein the front side forward control signal electrically triggers the front side display to display the forward indication arrow;
wherein the front side reverse control signal electrically triggers the front side display to display the reverse indication arrow;
wherein the front side left control signal electrically triggers the front side display to display the left indication arrow;
wherein the front side right control signal electrically triggers the front side display to display the right indication arrow.

9. The signaling device according to claim 8
wherein the one or more displays further comprises a rear side display;
wherein the rear side display is a display selected from the one or more displays;
wherein the rear side display mounts visibly on the rear side of the emergency vehicle proximal to the top side of the emergency vehicle;
wherein the plurality of control signals comprises a rear side forward control signal, a rear side reverse control signal, a rear side left control signal, and a rear side right control signal;
wherein the rear side forward control signal is an electrical signal generated by the logical device;
wherein the rear side reverse control signal is an electrical signal generated by the logical device;
wherein the rear side left control signal is an electrical signal generated by the logical device;
wherein the rear side right control signal is an electrical signal electrical signal generated by the logical device.

10. The signaling device according to claim 9
wherein the rear side forward control signal is transmitted to the rear side display;
wherein the rear side reverse control signal is transmitted to the rear side display;
wherein the rear side left control signal is transmitted to the rear side display;
wherein the rear side right control signal is transmitted to the rear side display.

11. The signaling device according to claim 10
wherein the rear side forward control signal electrically triggers the rear side display to display the forward indication arrow;
wherein the rear side reverse control signal electrically triggers the rear side display to display the reverse indication arrow;
wherein the rear side left control signal electrically triggers the rear side display to display the left indication arrow;
wherein the rear side right control signal electrically triggers the rear side display to display the right indication arrow.

12. The signaling device according to claim 11
wherein the logical device further comprises a circuit network that illuminates a plurality of LEDs into the signal selected from the plurality of direction signals as selected by the logical device based on the plurality of inputs;
wherein the plurality of LEDs illuminate the plurality of direction signals.

* * * * *